US012165545B2

(12) United States Patent
Xie et al.

(10) Patent No.: US 12,165,545 B2
(45) Date of Patent: Dec. 10, 2024

(54) ELECTRONIC LABEL AND ELECTRONIC LABEL SYSTEM

(71) Applicants: CHONGQING BOE SMART ELECTRONICS SYSTEM CO., LTD., Chongqing (CN); BOE TECHNOLOGY GROUP CO., LTD., Beijing (CN)

(72) Inventors: Yunyan Xie, Beijing (CN); Bo Liu, Beijing (CN); Lichun Chen, Beijing (CN)

(73) Assignees: CHONGQING BOE SMART ELECTRONICS SYSTEM CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 241 days.

(21) Appl. No.: 17/809,557

(22) Filed: Jun. 28, 2022

(65) Prior Publication Data

US 2022/0327966 A1 Oct. 13, 2022

Related U.S. Application Data

(63) Continuation-in-part of application No. 17/188,344, filed on Mar. 1, 2021, now Pat. No. 11,397,447, (Continued)

(30) Foreign Application Priority Data

Sep. 18, 2019 (CN) ........................ 201910881285.7

(51) Int. Cl.
*G09F 3/20* (2006.01)

(52) U.S. Cl.
CPC .................................. *G09F 3/208* (2013.01)

(58) Field of Classification Search
CPC .................... G06K 7/10079; G06K 19/07749

(Continued)

(56) References Cited

U.S. PATENT DOCUMENTS 6,437,893 B1 8/2002 Rivollet et al.
9,197,704 B2 11/2015 Sun et al.

(Continued)

FOREIGN PATENT DOCUMENTS

CN 102857539 A 1/2013
CN 103594028 A 2/2014

(Continued)

OTHER PUBLICATIONS

First Chinese Office Action dated Jan. 7, 2021, for corresponding Chinese Application No. 201910881285.7.

(Continued)

*Primary Examiner* — Tanmay K Shah
(74) *Attorney, Agent, or Firm* — Kinney & Lange, P.A.

(57) ABSTRACT

An electronic label and an electronic label system are disclosed. The electronic label includes: a plurality of display screens; a communicator configured to receive content data to be displayed on the plurality of display screens; and a controller including a serial data interface and configured to transmit, through the serial data interface, the content data to be displayed on the plurality of display screens and a control signal generated by the controller for controlling the plurality of display screens to the plurality of display screens respectively, so as to control the plurality of display screens to display the respective content data received according to the control signal.

12 Claims, 12 Drawing Sheets

Figure 1:
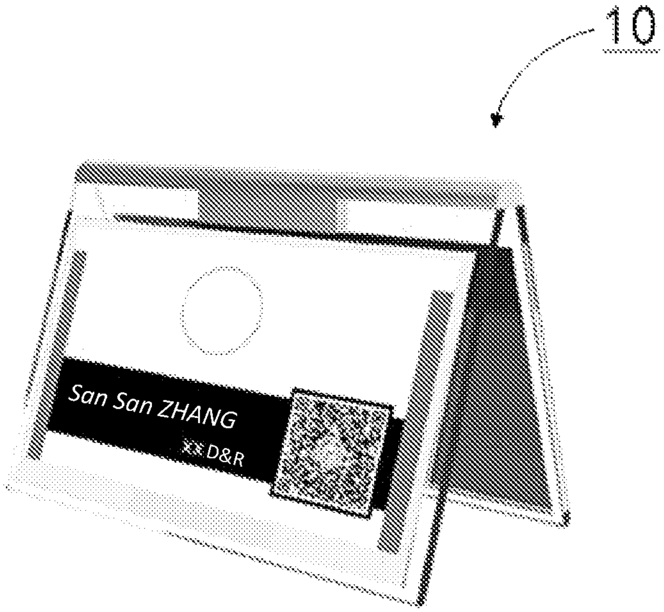

Related U.S. Application Data which is a continuation-in-part of application No. 16/828,160, filed on Mar. 24, 2020, now Pat. No. 10,984,202.

(58) Field of Classification Search
USPC ........................................................ 340/572.8
See application file for complete search history.

(56) References Cited

U.S. PATENT DOCUMENTS

| | | | | |
|---|---|---|---|---|
| 2011/0084840 | A1 | 4/2011 | Mercier et al. | |
| 2013/0002406 | A1 | 1/2013 | Sun et al. | |
| 2015/0179129 | A1 | 1/2015 | Byun | |
| 2016/0035291 | A1* | 2/2016 | Hung | H04L 67/12 345/204 |
| 2016/0104397 | A1* | 4/2016 | Kim | G09F 3/208 40/5 |
| 2016/0379102 | A1* | 12/2016 | Ferguson | G06Q 10/087 235/385 |
| 2017/0293959 | A1* | 10/2017 | Itou | G06Q 30/0623 |

FOREIGN PATENT DOCUMENTS

| | | | |
|---|---|---|---|
| CN | 104732403 | A | 6/2015 |
| CN | 107222577 | A | 9/2017 |
| CN | 108109591 | A | 6/2018 |
| CN | 109461395 | A | 3/2019 |
| JP | 2011096039 | A | 5/2011 |

OTHER PUBLICATIONS

Second Chinese Office Action dated Jun. 22, 2021, for corresponding Chinese Application No. 201910881285.7.

Non-Final Rejection dated Aug. 20, 2020, for corresponding U.S. Appl. No. 16/828,160.

Notice of Allowance dated Dec. 2, 2020, for corresponding U.S. Appl. No. 16/828,160.

Non-Final Rejection dated Dec. 6, 2021, for corresponding U.S. Appl. No. 17/188,344.

Notice of Allowance dated Mar. 21, 2022, for corresponding U.S. Appl. No. 17/188,344.

* cited by examiner

ELECTRONIC LABEL AND ELECTRONIC LABEL SYSTEM

CROSS-REFERENCE TO RELATED APPLICATION(S)

This application is a continuation-in-part of U.S. application Ser. No. 17/188,344, filed Mar. 1, 2021, entitled "ELECTRONIC LABEL AND METHOD FOR DRIVING THE SAME," by Yunyan Xie, Bo Liu, and Lichun Chen, which in turn is a continuation-in-part of U.S. application Ser. No. 16/828,160, filed Mar. 24, 2020, entitled "ELECTRONIC LABEL AND METHOD FOR DRIVING THE SAME," by Yunyan Xie, Bo Liu, and Lichun Chen (now U.S. Pat. No. 10,984,202), which claims priority to the Chinese Patent Application No. 201910881285.7, filed on Sep. 18, 2019, all of which are incorporated herein by reference in their entireties.

TECHNICAL FIELD

The present disclosure relates to the field of display technology, and more particularly, to an electronic label and an electronic label system.

BACKGROUND

With the progress of technology and the development of Internet of Things technology, electronic labels have been widely used. The electronic labels have advantages such as low power consumption and environmental protection, and may be connected to an offline scene database through a wireless network to display relevant information in real time and accurately. Therefore, the trend of replacing paper labels with the electronic labels has become.

However, the electronic labels have problems such as a high manufacturing cost and inflexible display.

SUMMARY

According to an aspect of the present disclosure, there is provided an electronic label, including: a plurality of display screens; a communicator configured to receive content data to be displayed on the plurality of display screens; and a controller including a serial data interface and configured to transmit, through the serial data interface, the content data to be displayed on the plurality of display screens and a control signal generated by the controller for controlling the plurality of display screens to the plurality of display screens respectively, so as to control the plurality of display screens to display the respective content data received according to the control signal.

In some embodiments, the serial data interface includes: at least one selection interface configured to select at least one of the plurality of display screens; a clock interface configured to transmit a synchronization clock signal to the plurality of display screens; and a data interface configured to serially transmit the content data to be displayed on the plurality of display screens and the control signal to the plurality of display screens under control of the synchronization clock signal.

In some embodiments, the controller is further configured to: select the plurality of display screens through the at least one selection interface at the same time in response to the content data to be displayed on the plurality of display screens being the same; and sequentially select at least one of the plurality of display screens through the at least one selection interface in response to the content data to be displayed on the plurality of display screens being different.

In some embodiments, a number of the at least one selection interface is less than or equal to a number of the plurality of display screens.

In some embodiments, when a number of the at least one selection interface is less than a number of the plurality of display screens, and selection signals transmitted through the at least one selection interface are encoded and decoded to generate a selection signal corresponding to each of the plurality of display screens.

In some embodiments, each of the plurality of display screens includes a buffer configured to store content data received from the controller to be displayed on the display screen.

In some embodiments, the display screens are electronic ink screens, and the electronic label further includes a booster circuit connected to the electronic ink screens and configured to power on and power off the electronic ink screens.

In some embodiments, the booster circuit is further connected to the controller, and is controlled by the controller to power on and power off the electronic ink screens.

In some embodiments, the content data includes a type flag and an end flag, wherein the type flag is used to indicate whether the transmitted data is content data or a control signal, and the end flag is used to indicate the end of data transmission.

In some embodiments, the electronic label further includes a Near Field Communication (NFC) antenna connected to the controller, and the controller is further configured to transmit an identification information of the electronic label by using the NFC antenna in response to an identification request signal received by the NFC antenna.

In some embodiments, the NFC antenna is an NFC coil and the controller is a micro controller unit (MCU).

According to another aspect of the present disclosure, there is provided an electronic label system, including: an electronic label including a plurality of display screens, a communicator, and a controller, wherein the communicator is configured to receive content data to be displayed on the plurality of display screens from a repeater, the controller includes a serial data interface, and the controller is configured to transmit, through the serial data interface, the content data to be displayed on the plurality of display screens and a control signal generated by the controller for controlling the plurality of display screens to the plurality of display screens respectively, so as to control the plurality of display screens to display the respective content data received according to the control signal; and the repeater configured to receive content data to be displayed on the plurality of display screens and distribute the content data to the communicator.

In some embodiments, the serial data interface includes: at least one selection interface configured to select at least one of the plurality of display screens; a clock interface configured to transmit a synchronization clock signal to the plurality of display screens; and a data interface configured to serially transmit the content data to be displayed on the plurality of display screens and the control signal to the plurality of display screens under control of the synchronization clock signal.

In some embodiments, the electronic label further includes a Near Field Communication (NFC) antenna connected to the controller, and the controller is further configured to transmit an identification information of the electronic label by using the NFC antenna in response to an identification request signal received by the NFC antenna.

In some embodiments, the NFC antenna is an NFC coil and the controller is a micro controller unit (MCU).

BRIEF DESCRIPTION OF THE ACCOMPANYING DRAWINGS

Figure 3:
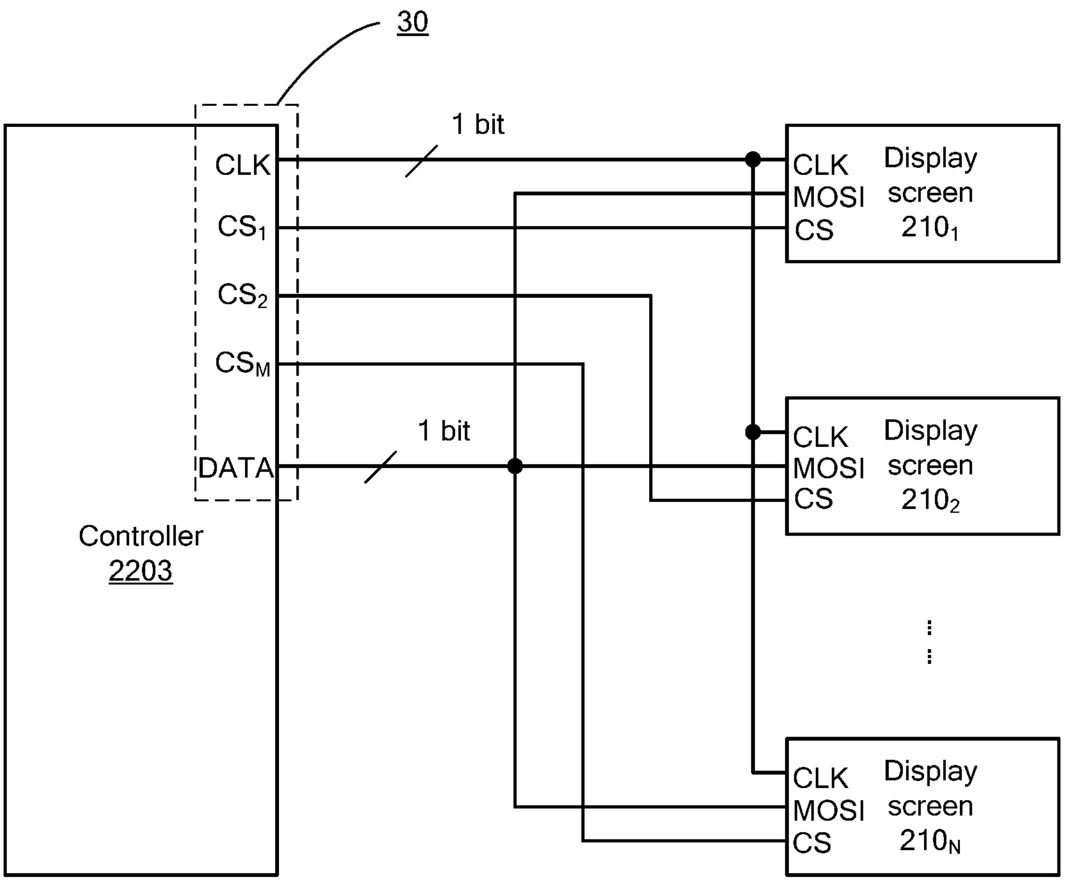
Figure 4A:
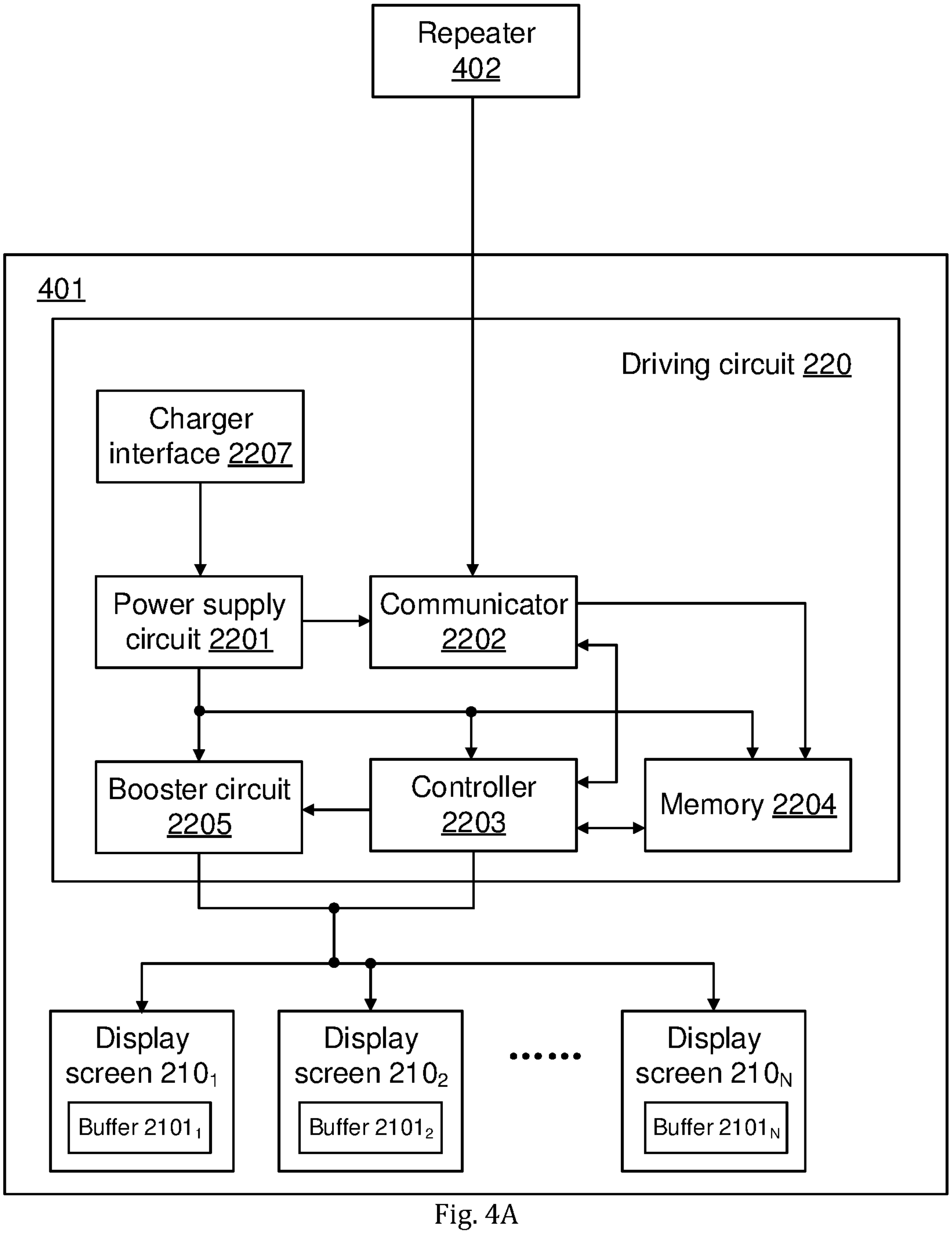

The above and other purposes, features, and advantages of the embodiments of the present disclosure will become more obvious by describing the embodiments of the present disclosure with reference to the accompanying drawings. It should be illustrated that throughout the accompanying drawings, the same elements are represented by the same or similar reference signs. In the accompanying drawings:

FIG. 1 schematically illustrates an application scenario of an electronic label;

FIGS. 2A to 2D schematically illustrate structural block diagrams of an electronic label according to an embodiment of the present disclosure;

FIG. 3 schematically illustrates a structure of a serial data interface of an electronic label according to an embodiment of the present disclosure;

FIG. 4A schematically illustrates a block diagram of an electronic label system according to an embodiment of the present disclosure.

Figure 4B:
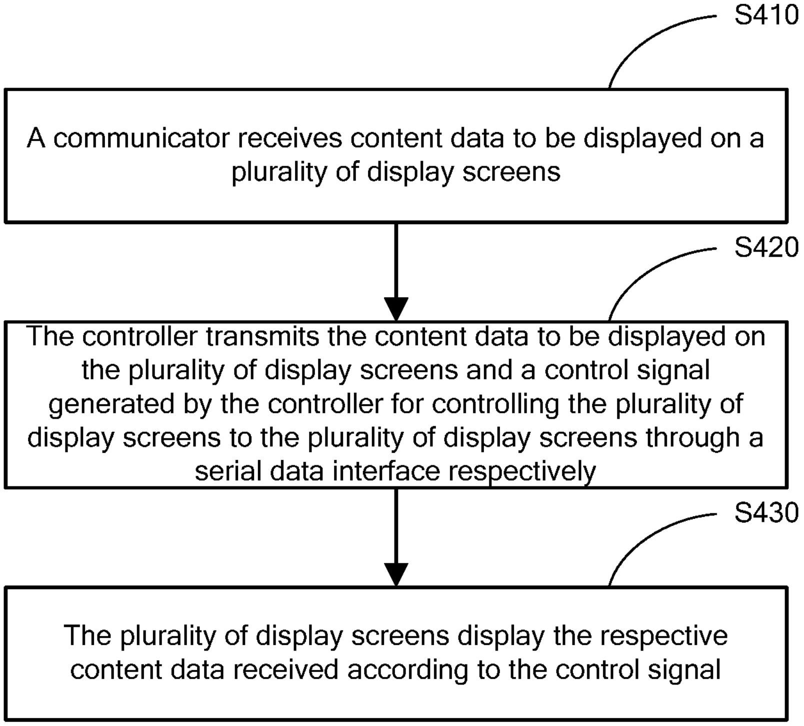
Figure 5A:
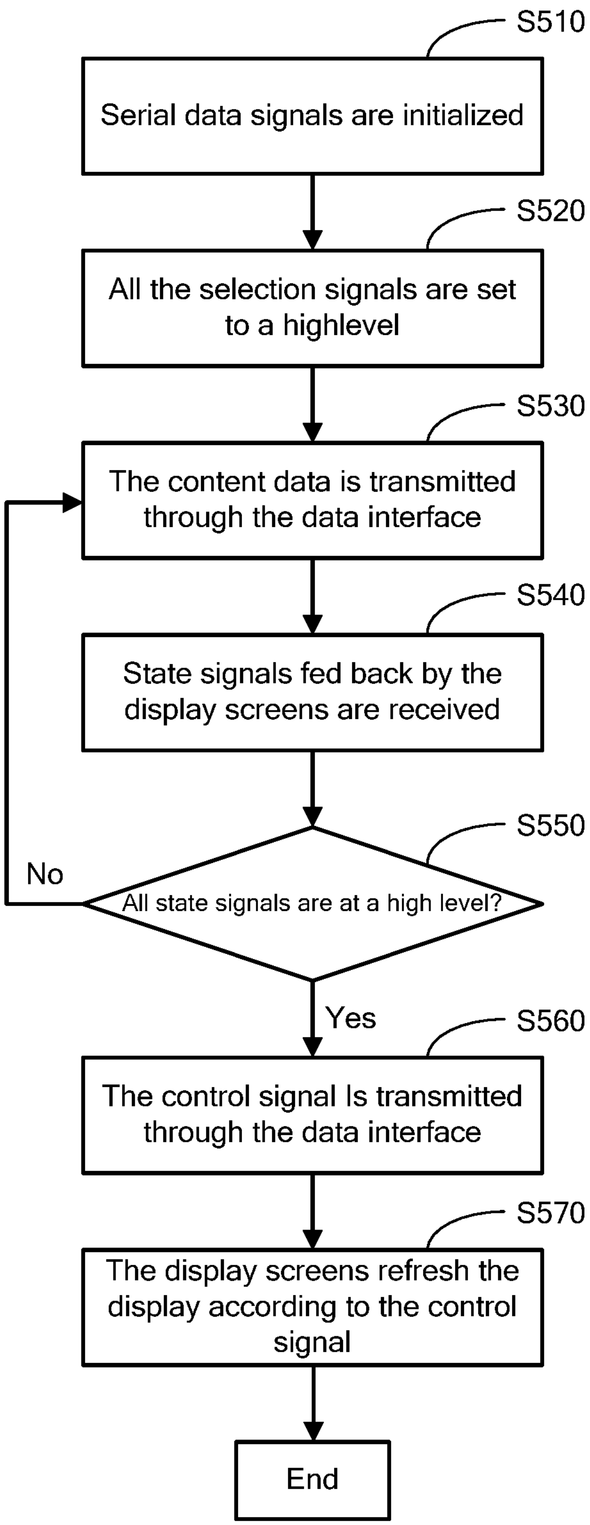
Figure 5B:
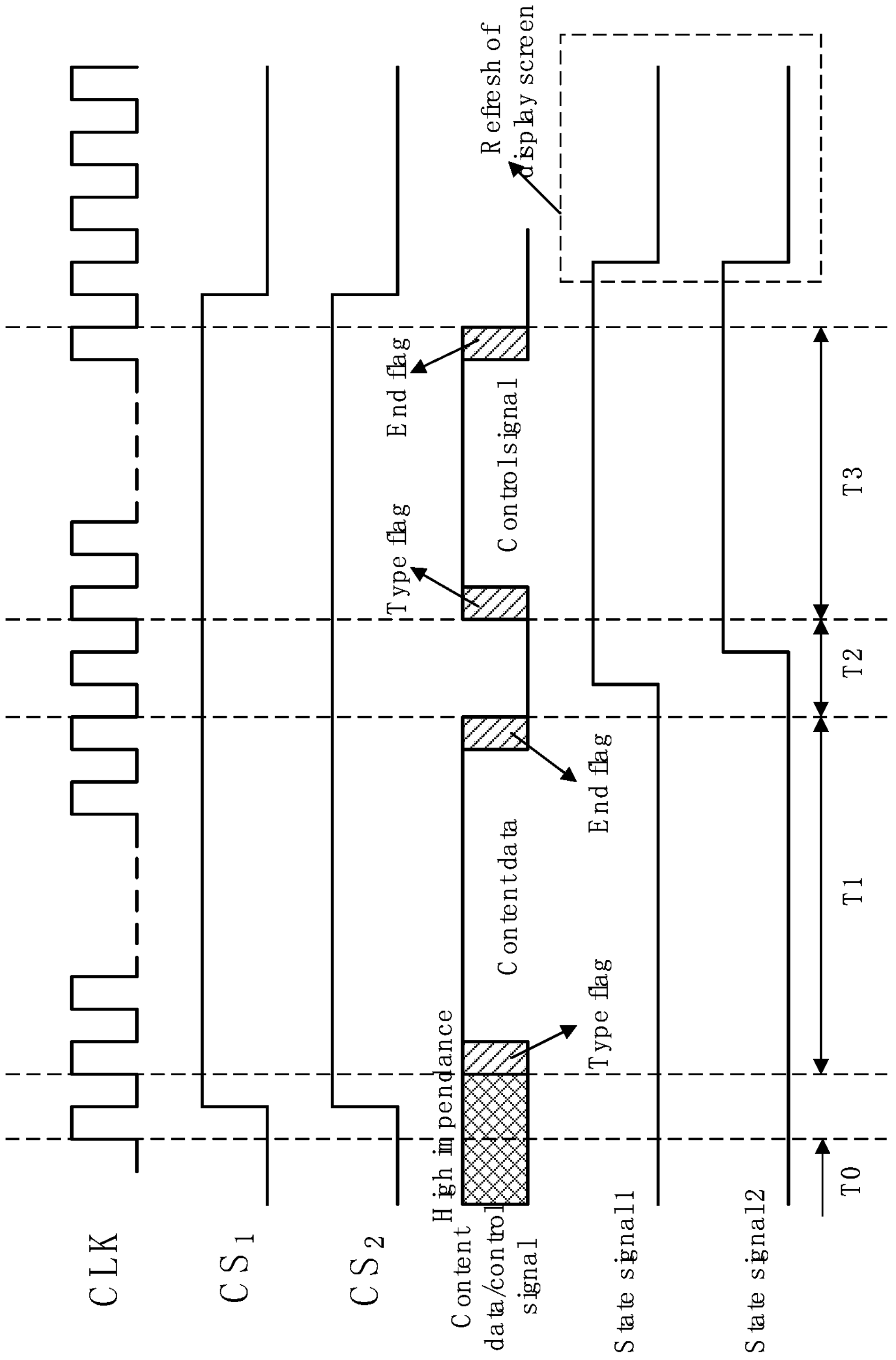
Figure 6A:
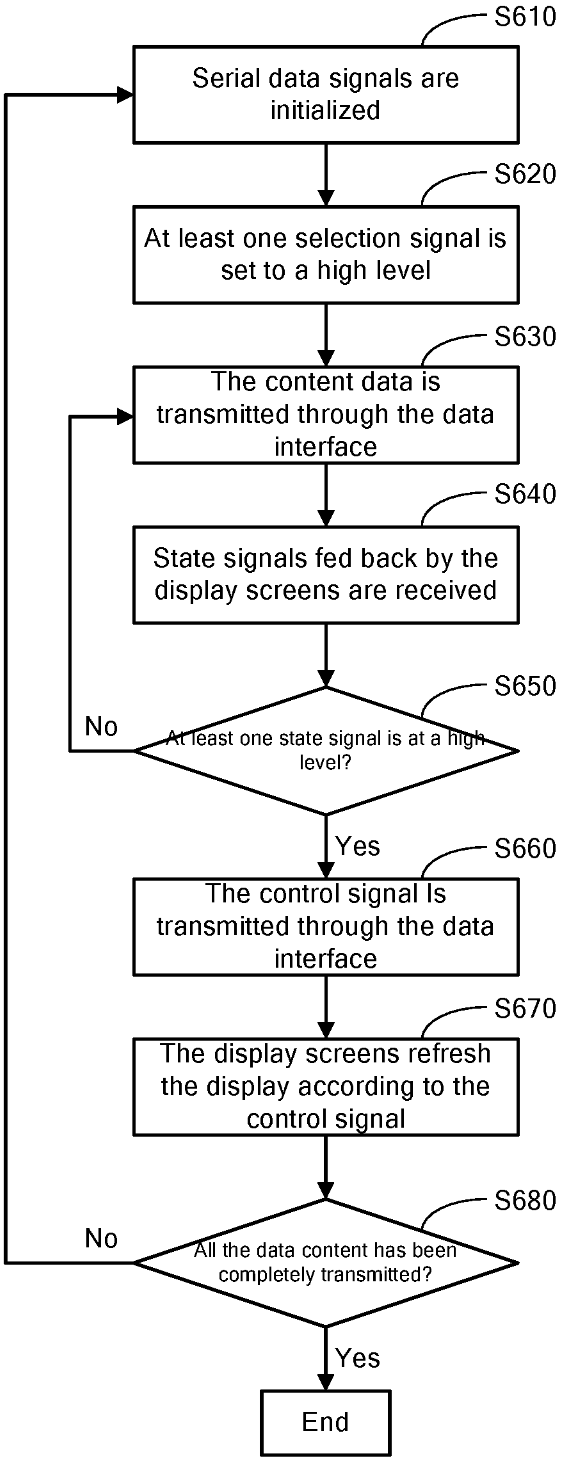
Figure 6B:
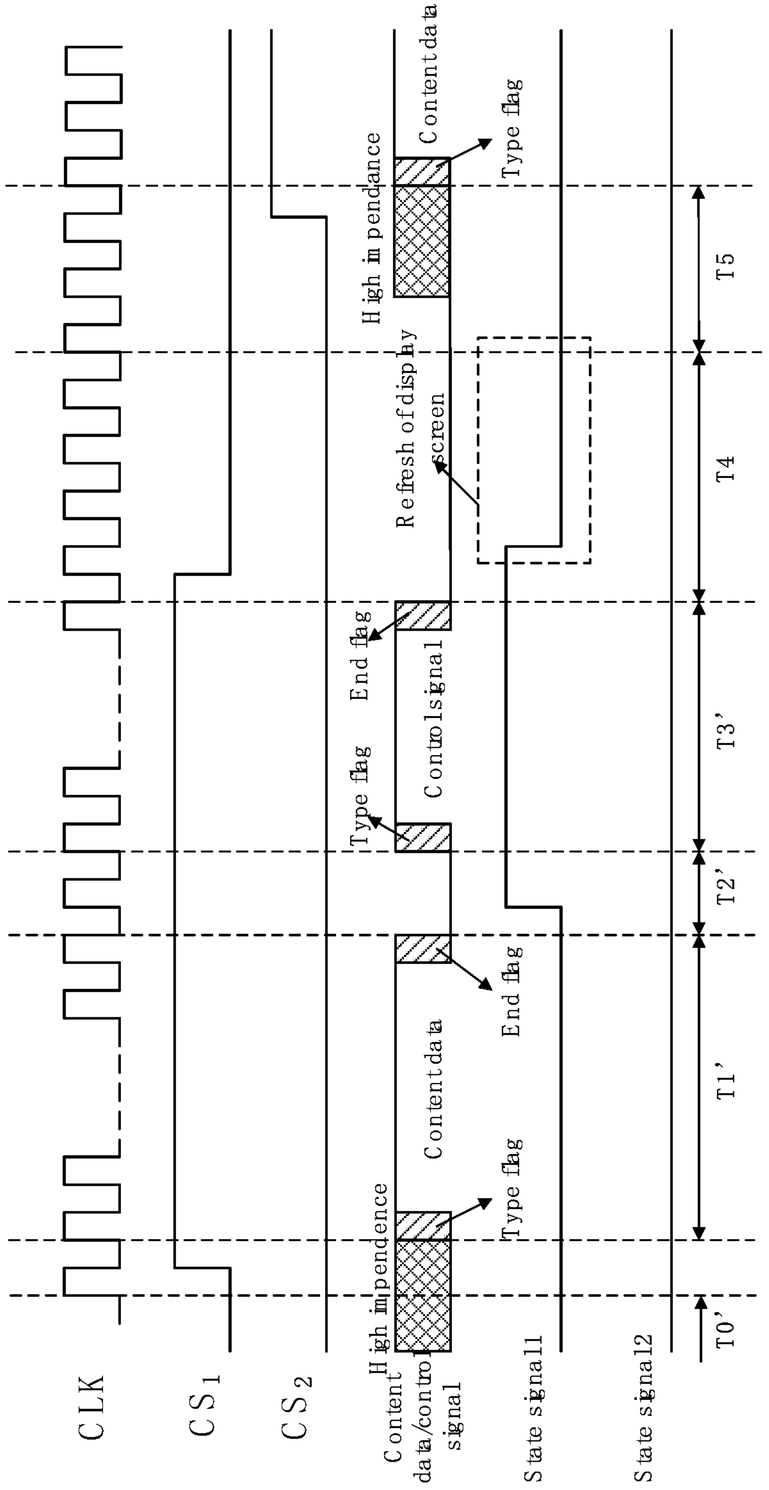

FIG. 4B schematically illustrates a flowchart of a method for driving an electronic label according to an embodiment of the present disclosure;

FIG. 5A schematically illustrates a flowchart of a method for driving an electronic label according to an example of the present disclosure;

FIG. 5B schematically illustrates a signal timing diagram of the exemplary method shown in FIG. 5A;

FIG. 6A schematically illustrates a flowchart of a method for driving an electronic label according to another example of the present disclosure; and FIG. 6B schematically illustrates a signal timing diagram of the exemplary method shown in FIG. 6A.

DETAILED DESCRIPTION

In order to make the purposes, technical solutions and advantages of the embodiments of the present disclosure more clear, the technical solutions in the embodiments of the present disclosure will be clearly and completely described below in conjunction with the accompanying drawings in the embodiments of the present disclosure. Obviously, the embodiments described are a part of the embodiments of the present disclosure instead of all the embodiments. All other embodiments obtained by those of ordinary skill in the art based on the described embodiments of the present disclosure without contributing any creative work are within the protection scope of the present disclosure. In the following description, some specific embodiments are for illustrative purposes only and are not to be construed as limiting the present disclosure, but merely examples of the embodiments of the present disclosure. The conventional structure or construction will be omitted when it may cause confusion with the understanding of the present disclosure. It should be illustrated that shapes and dimensions of components in the figures do not reflect true sizes and proportions, but only illustrate contents of the embodiments of the present disclosure.

Unless otherwise defined, technical terms or scientific terms used in the embodiments of the present disclosure should be of ordinary meanings to those skilled in the art. "First", "second" and similar words used in the embodiments of the present disclosure do not represent any order, quantity or importance, but are merely used to distinguish between different constituent parts.

Furthermore, in the description of the embodiments of the present disclosure, the term "connected to" or "connected with" may mean that two components are directly connected, or that two components are connected via one or more other components. In addition, the two components may be connected or coupled by wire or wirelessly.

Further, in the description of the embodiments of the present disclosure, the terms "first level" and "second level" are only used to distinguish amplitudes of the two levels. For example, the following description is made by taking the "first level" being a relatively high level and the "second level" being a relatively low level as an example. It may be understood by those skilled in the art that the present disclosure is not limited thereto.

The electronic labels are developed from original electronic price labels, and are mainly used in public places such as shopping malls, supermarkets etc. With the development of the Internet of Things technology and the application of the electronic labels and their derivatives, the diversified application of the electronic labels may become an inevitable trend in the development of information technology. FIG. 1 illustrates an exemplary application scenario of an electronic label. As shown in FIG. 1, the electronic label 10 is used as an electronic table card in an office, a media, a conference, etc.

As more and more application scenarios are developed, problems of the electronic labels also gradually appear. On the one hand, with the increase in the demand for display information and the increase in display content, the demand for the electronic labels has increased significantly. Each of the electronic labels generally has a display screen and is driven by one driving circuit, and therefore if a large number of electronic labels are used, it may lead to a high cost. On the other hand, the public has more and more new requirements for display forms and appearance etc. of the electronic labels. This requires the electronic labels not only to update the display content in time, but also have more flexibility and display diversity. For example, in a scenario shown in FIG. 1, it is more desirable that the electronic table card may display content on opposite sides. Further, according to needs in actual situations, the electronic table card may display the same content on the opposite sides or display different content on the opposite sides. However, there is currently no solution for these applications.

According to the technical solutions of the embodiments of the present disclosure, there is provided an electronic label, in which content data is transmitted to a plurality of display screens by a controller, which significantly reduces a manufacturing cost of the electronic label. In addition, the content data to be displayed is transmitted to the plurality of display screens through a serial data interface of the controller, which may reduce a number of interfaces of the controller and simplify data transmission between the controller and the display screens. Further, the display screens may display separately according to the respective content data received, which increases flexibility of operations of the electronic label.

According to an embodiment of the present disclosure, there is provided an electronic label. The electronic label according to the embodiment of the present disclosure may include a plurality of display screens. The electronic label according to the embodiment of the present disclosure may further include a communicator configured to receive content data to be displayed on the plurality of display screens. The electronic label according to the embodiment of the present disclosure may further include a controller. The controller may include a serial data interface. The controller is configured to transmit the content data to be displayed on the plurality of display screens and control signal generated by the controller for controlling the plurality of display screens to the plurality of display screens through the serial data interface, respectively, to control the plurality of display screens to display the respective content data received according to the control signal.

Figure 2A:
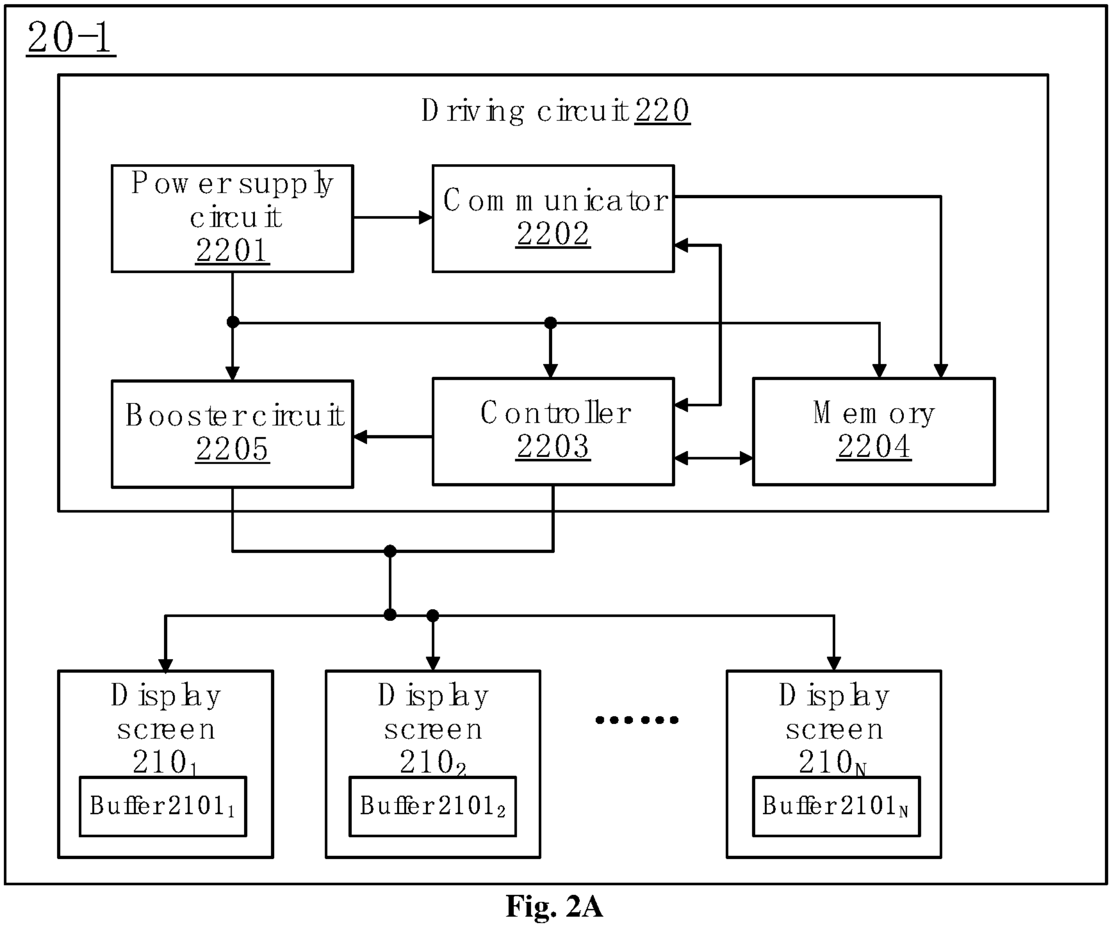

FIG. 2A schematically illustrates a block diagram of an electronic label according to an embodiment of the present disclosure. As shown in FIG. 2A, the electronic label 20-1 according to the embodiment of the present disclosure may include a plurality of display screens $\mathbf{210}_1$ to $\mathbf{210}_N$ and a driving circuit 220, wherein N is an integer greater than or equal to 2.

In some embodiments, the display screens may be electronic ink screens. The electronic ink screens are implemented by a display technology for simulating papers, and therefore are also referred to as electronic papers. Although the electronic ink screens are usually more expensive than commonly-used display screens, since the electronic ink screens have characteristics such as bi-stable display, the electronic ink may be powered on during data transmission and maintain the display when they are powered off. Therefore, the electronic ink screens are particularly suitable for a scenario in which static display and high requirements for energy consumption are required, and thus are increasingly used in the electronic labels. Of course, it may be understood by those skilled in the art that the embodiments of the present disclosure may also be applied to other general-purpose active display screens (for example, Liquid Crystal (LCD) display screens or Light Emitting Diode (LED) display screens, etc.)

The driving circuit 220 is used to drive the plurality of display screens $\mathbf{210}_1$ to $\mathbf{210}_N$. As shown in FIG. 2A, the driving circuit 220 may further include a power supply circuit 2201, a communicator 2202, a controller 2203, and a memory 2204.

The power supply circuit 2201 is connected to the communicator 2202, the controller 2203, and the memory 2204, respectively, and is used to supply power to the communicator 2202, the controller 2203, and the memory 2204.

The communicator 2202 is used to receive content data to be displayed on the plurality of display screens $\mathbf{210}_1$ to $\mathbf{210}_N$ from an external source. The external source may be, for example, an external server, an external database, a cloud server, a mobile terminal, etc., and the embodiments of the present disclosure are not limited thereto. The communicator 2202 may be, for example, a wireless communication apparatus configured to perform communication based on a wireless transmission protocol. The wireless transmission protocol includes, but not limited to, Bluetooth, WIFI, Zigbee, or mobile communication protocols based on technologies such as 3G, 4G etc. After receiving the content data to be displayed on the plurality of display screens $\mathbf{210}_1$ to $\mathbf{210}_N$, the communicator 2202 temporarily stores the content data in the memory 2204.

The memory 2204 is used to temporarily store the received content data, and may be configured as a volatile storage medium or a non-volatile storage medium. In addition, the memory 2204 is further used to temporarily store instructions required by the controller 2203 and data generated by the controller 2203 during operations.

In some embodiments, the driving circuit 220 may further include a booster circuit 2205. When the display screens are electronic ink screens, the booster circuit may be configured in the driving circuit 220 to provide a power supply voltage to the electronic ink screens. As described above, the electronic ink screens may be powered on during data transmission and may be powered off and display after the data transmission. Therefore, the booster circuit 2205 is configured in the driving circuit 220, so that power may be supplied by the booster circuit 2205 to the electronic ink screens before the content data to be displayed on the electronic ink screens is transmitted thereto, and power-on of the electronic ink screens ends after display of the content data is refreshed. As shown in FIG. 2A, the booster circuit 2205 is connected to the power supply circuit 2201, which may be used to supply power to the booster circuit 2205. The booster circuit 2205 is further connected to the plurality of display screens $\mathbf{210}_1$ to $\mathbf{210}_N$ (i.e., electronic ink screens) respectively, to power on and power off the electronic ink screens. The booster circuit 2205 is further connected to the controller 2203, and the controller 2203 controls the above power-on and power-off processes, which is beneficial to reducing the energy consumption of the entire electronic label.

When the display screens are general-purpose active display screens (for example, LCD display screens or LED display screens etc.), it is necessary to continuously supply power to the display screens during the display process thereof. Therefore, this type of display screens usually each have a power supply (for example, a battery slot) integrated therein, and the display screens are supplied with power by themselves. Therefore, the booster circuit 2205 may not be provided in the driving circuit 220.

The controller 2203 controls the overall operation of the driving circuit 220, including controlling a communication process of the communicator 2202, controlling a storage process of the memory 2204, controlling power-on and power-off processes of the booster circuit 2205, etc. In addition, the controller 2203 further includes a serial data interface, through which the content data to be displayed on the plurality of display screens $\mathbf{210}_1$ to $\mathbf{210}_N$ and the control signal generated by the controller 2203 for controlling the plurality of display screens $\mathbf{210}_1$ to $\mathbf{210}_N$ may be transmitted to the plurality of display screens $\mathbf{210}_1$ to $\mathbf{210}_N$, to control the plurality of display screens $\mathbf{210}_1$ to $\mathbf{210}_N$ to display the respective content data received according to the control signal. Detailed description will be given below in combination with specific embodiments.

Figure 2B:
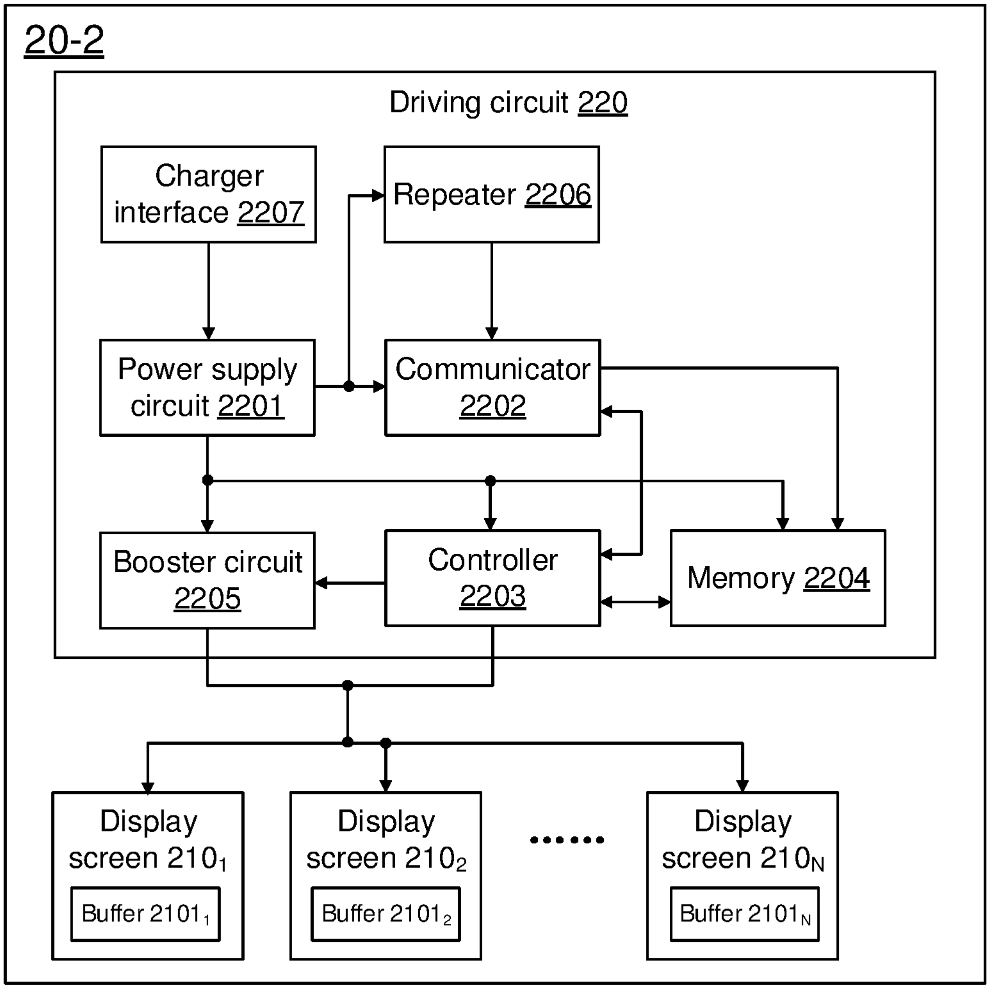

FIG. 2B schematically illustrates a block diagram of an electronic label according to another embodiment of the present disclosure. As shown in FIG. 2B, the driving circuit 220 of the electronic label 20-2 may further include a repeater 2206 and a charger interface 2207.

The repeater 2206 is connected to the communicator 2202 and the power supply circuit 2201. The repeater 2206 is configured to receive content data to be displayed on the plurality of display screens $\mathbf{210}_1$ to $\mathbf{210}_N$ and distribute the content data to the communicator 2202 according to a signal strength between the repeater 2206 and the communicator 2202. The communicator 2202 is configured to receive the content data from the repeater 2206. The power supply circuit 2201 is used to supply power to the repeater 2206.

According to the embodiments of the present disclosure, the content data may be received by the repeater 2206 in batch, and distributed according to the signal strength between the repeater 2206 and the communicator 2202, thereby ensuring a reliable receipt of the content data and reducing power consumption.

The charger interface 2207 is configured to charger the electronic label 20-2. In some embodiments, the charger interface 2207 is a type C interface. According to the embodiments of the present disclosure, the working duration of the electronic label 20-2 may be increased and the maintenance cost of the electronic label 20-2 may be reduced.

Figure 2C:
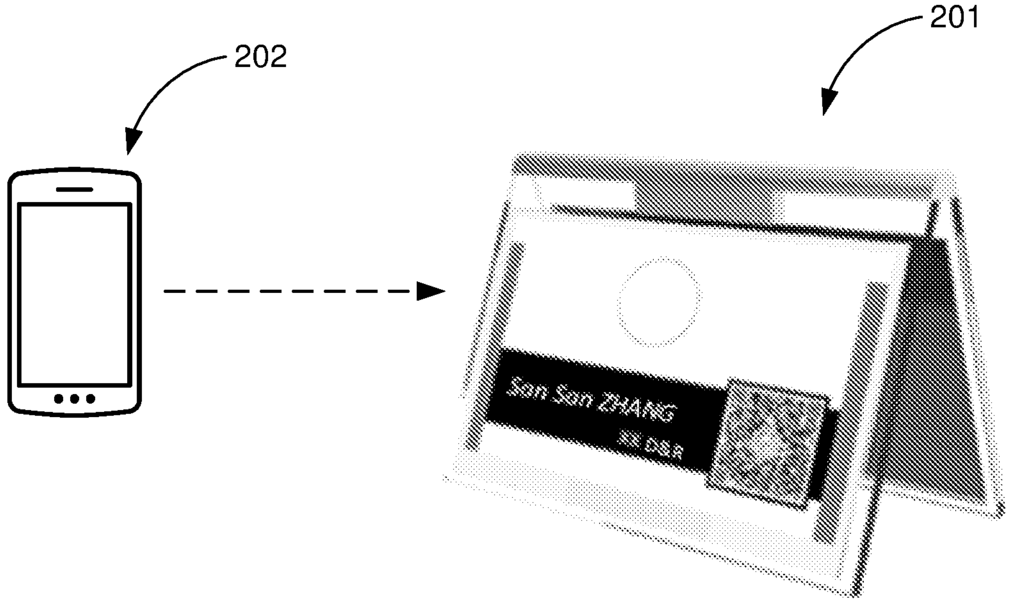

According to the embodiments of the present disclosure, the communicator 2202 is further configured to receive control instructions form an application installed on a mobile phone. The control instructions may be used to control the at least one of the plurality of display screens $\mathbf{210}_1$ to $\mathbf{210}_N$. Referring to FIG. 2C, the electronic label 201 (the communicator 2202) may communicate with the mobile phone 202 (an application), and receive control instructions form the mobile phone 202. In some embodiments, when there are individual displays that need to be updated separately, they may be updated directly by using the mobile phone 202. Accordingly, the usage scenarios of table cards may be greatly increased.

In the embodiment shown in FIGS. 2A and 2B, the display screens $\mathbf{210}_1$ to $\mathbf{210}_N$ may further include respective buffers $\mathbf{2101}_1$ to $\mathbf{2101}_N$. The buffers $\mathbf{2101}_1$ to $\mathbf{2101}_N$ are configured to store the content data received from the controller 2203 to be displayed on the display screens $\mathbf{210}_1$ to $\mathbf{210}_N$ respectively.

In the embodiment of the present disclosure, the content data to be displayed is transmitted to the plurality of display screens $\mathbf{210}_1$ to $\mathbf{210}_N$ through the serial data interface of the controller 2203. The serial data interface may be a group of data interfaces. A structure of the serial data interface and a connection relationship between the controller 2203 and the plurality of display screens $\mathbf{210}_1$ to $\mathbf{210}_N$ through the serial data interface will be described in detail below with reference to the accompanying drawings.

Figure 2D:
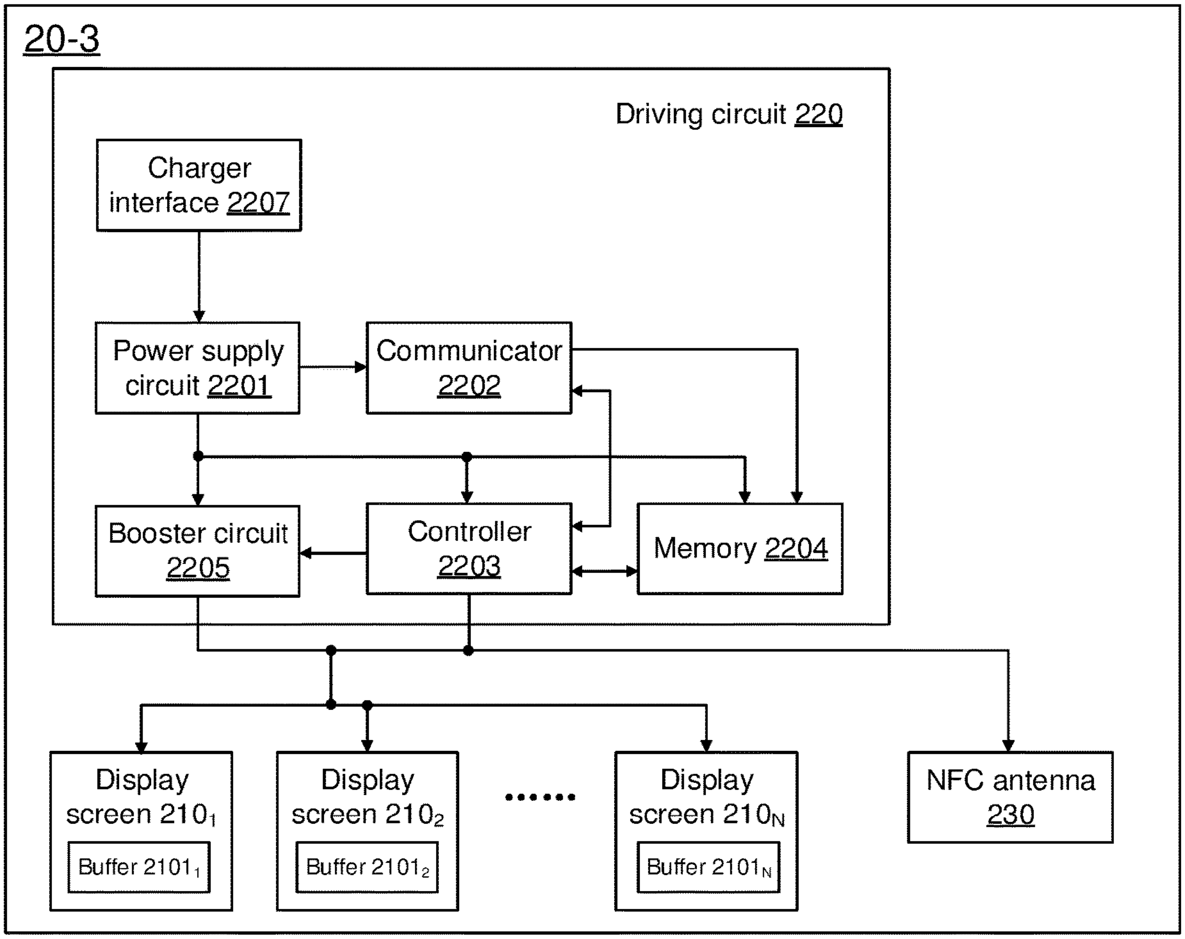

FIG. 2D schematically illustrates a block diagram of an electronic label according to another embodiment of the present disclosure. As shown in FIG. 2D, the electronic label 20-3 may include a plurality of display screens and a driving circuit. In some embodiments, the plurality of display screens of the electronic label 20-3 may be implemented as the plurality of display screens $\mathbf{210}_1$ to $\mathbf{210}_N$ as described above, which will not be described again in detail. In some embodiments, the driving circuit of the electronic label 20-3 may be implemented as the driving circuit 220 as described above, e.g. the driving circuit 220 of the electronic label 20-1, which will not be described again in detail. As shown in FIG. 2D, the electronic label 20-3 may further include a Near Field Communication (NFC) antenna 230 connected to the controller 2203. The controller 2203 may be further configured to transmit an identification information of the electronic label 20-3 by using the NFC antenna 230 in response to an identification request signal received by the NFC antenna 230. In some embodiments, the NFC antenna 230 may be an NFC coil. In some embodiments, the controller 2203 may be a micro controller unit (MCU). The MCU may have a built-in NFC function for controlling the NFC antenna to transmit and/or receive signals. As an example, an identification information of the electronic label 20-3 may be stored in the memory 2204. When an electronic device (e.g. a mobile phone) having NFC function being enabled approaches the electronic label 20-3, an identification request signal transmitted from the electronic device may be received by the NFC antenna 230 of the electronic label 20-3. In response to the identification request signal being received by the NFC 230, the controller 2203 may transmit the identification information stored in the memory to the terminal device through the NFC antenna 230. The electronic device may record the identification information of the electronic label.

FIG. 3 schematically illustrates a structure of a serial data interface of an electronic label according to an embodiment of the present disclosure. As shown in FIG. 3, the serial data interface 30 may include at least one selection interface, which is used to transmit selection signals $CS_1$ to $CS_M$ respectively, so as to select at least one of the plurality of display screens $\mathbf{210}_1$ to $\mathbf{210}_N$. An interface data width of each of the selection signal interfaces may be 1 bit. In some embodiments, a first level (for example, a high level) may be set as an valid level of the selection signals $CS_1$ to $CS_M$, that is, when a selection signal is at the first level (for example, the high level), a corresponding display screen is selected. It may be understood by those skilled in the art that a second level (for example, a low level) may also be set as the valid level of the selection signals $CS_1$ to $CS_M$, that is, when a selection signal is at the second level (for example, the low level), a corresponding display screen is selected. The selected display screen may receive content data and a control signal transmitted by the controller 2203. The unselected display screens may not receive content data and a control signal transmitted by the controller 2203.

In the example shown in FIG. 3, for example, when the display screen $\mathbf{210}_1$ is selected using the selection signal $CS_1$, only the display screen $\mathbf{210}_1$ may receive content data and a control signal transmitted by the controller 2203 and transmit a signal to the controller 2203, and remaining unselected display screens (for example, the display screens $\mathbf{210}_2$ to $\mathbf{210}_N$) may not receive content data and a control signal transmitted by the controller 2203, and may not transmit signals to the controller 2203.

As shown in FIG. 3, the selection interfaces through which the selection signals $CS_1$ to $CS_M$ are transmitted are connected to respective chip selection ports CS of the plurality of display screens $\mathbf{210}_1$ to $\mathbf{210}_N$. It should be illustrated that a number M of the selection interfaces may be less than or equal to a number N of the display screens $\mathbf{210}_1$ to $\mathbf{210}_N$, that is, $M \leq N$. When the number of the selection interfaces is equal to the number N of the display screens $\mathbf{210}_1$ to $\mathbf{210}_N$ (i.e., M=N), the selection interfaces may be directly connected to the respective chip selection ports CS of the display screens in one-to-one correspondence. A scenario where M=N is shown in FIG. 3, in which a selection interface through which the selection signal $CS_M$ is transmitted is connected to a chip selection port CS of the display screen $\mathbf{210}_N$.

In some embodiments, when the number M of the selection interfaces is less than the number N of the display screens $\mathbf{210}_1$ to $\mathbf{210}_N$, each of the selection interfaces may not be directly connected to a chip selection port of one of the display screens. In this case, the following methods may be used to realize connection between the selection interfaces and the display screens and the selection of the display screens.

For example, when the number M of the selection interfaces is less than the number N of the display screens $\mathbf{210}_1$ to $\mathbf{210}_N$, the selection signals $CS_1$ to $CS_M$ in the selection interfaces may be encoded and decoded to generate selection signals corresponding to the respective display screens. For example, if the number of the selection interfaces is 3, three selection signals $CS_1$ to $CS_3$ in the three selection interfaces may be binary-coded to further obtain eight selection signals (which may be denoted as $CS'_1$, $CS'_2$, $CS'_3$, $CS'_4$, $CS'_5$, $CS'_6$, $CS'_7$ and $CS'_8$ respectively). The above eight selection signals are obtained through a decoding process by adding a decoder, which may realize selection of eight display screens. This helps to reduce a number of ports of the controller 2203, thereby driving more display screens.

As another example, when the number M of the selection interfaces is less than the number N of the display screens $\mathbf{210}_1$ to $\mathbf{210}_N$, processing may be performed based on actual situations. If at least some of the plurality of display screens $\mathbf{210}_1$ to $\mathbf{210}_N$ always display the same content, the plurality of display screens $\mathbf{210}_1$ to $\mathbf{210}_N$ may be divided into several groups, display screens in each group display the same content, and display screens in different groups may display different content. Thereby, the same selection interface may be connected to all display screens in the same group at the same time, so that these display screens may be selected at the same time. In this way, more display screens may be selected using fewer selection signals while simplifying a transmission operation of the content data.

As shown in FIG. 3, the serial data interface may further include a clock interface. The clock interface may transmit a synchronization clock signal CLK to the plurality of display screens $\mathbf{210}_1$ to $\mathbf{210}_N$. The synchronization clock signal CLK is used for synchronization between data transmission and data reception between the controller 2203 and the plurality of electronic screens $\mathbf{210}_1$ to $\mathbf{210}_N$. According to some embodiments, the data transmission and the data reception may be set to be performed synchronously on a rising edge of the synchronization clock signal CLK. It may be understood by those skilled in the art that the data transmission and the data reception may be set to be performed synchronously on a falling edge of the synchronization clock signal CLK.

As shown in FIG. 3, the clock interface is connected to the corresponding ports (for example, CLK ports of serial peripheral interfaces SPI) of all the plurality of display screens $\mathbf{210}_1$ to $\mathbf{210}_N$ at the same time. For example, an interface data width of the clock interfaces is also 1 bit.

As shown in FIG. 3, the serial data interface may further include a data interface DATA, which is a serial data interface having an interface data width of 1 bit. The data interface DATA is configured to serially transmit the content data to be displayed on the plurality of display screens $\mathbf{210}_1$ to $\mathbf{210}_N$ and the control signal under synchronous control of the synchronization clock signal CLK.

As shown in FIG. 3, the data interface DATA may be connected to the corresponding ports of all the plurality of display screens $\mathbf{210}_1$ to $\mathbf{210}_N$ at the same time, for example, Master Output Slave Input (MOSI) ports of the serial peripheral interfaces SPI. It should be illustrated that only the MOSI ports of the serial peripheral interfaces SPI, instead of the overall structure of the SPIs, are shown on the respective display screens in FIG. 3. The controller 2203 may further implement conversion from parallel data to serial data in the driving circuit 220. In addition, built-in logics in the serial peripheral interfaces SPI for the display screens may complete the conversion from serial data to parallel data in the plurality of display screens $\mathbf{210}_1$ to $\mathbf{210}_N$. In addition, since the data interface DATA has a function of transmitting both the content data and the control signal, different type flags need to be set to distinguish the content data and the control signal. The controller 2203 may add the type flags in the data to be transmitted according to different types of the data. In addition, when the controller 2203 transmits the content data and the control signal to the display screens, the controller 2203 firstly transmits the type flags.

The controller 2203 may be implemented by a general-purpose element, for example, a microprocessor, a micro-controller, a Field Programmable Gate Array (FPGA) etc., and the embodiments of the present disclosure are not limited thereto. The content data and the control signal are transmitted by using a group of serial data interfaces including at least one selection interface, a clock interface, and a data interface, which may effectively reduce a cost of the driving circuit while simplifying the operation.

FIG. 4A schematically illustrates a block diagram of an electronic label system according to an embodiment of the present disclosure. As shown in FIG. 4A, the electronic label system 400 includes an electronic label 401 and a repeater 402. The electronic label 401 may be implemented as the electronic label according to any of the above described embodiments, e.g. as the electronic label 20-1, 20-3 or 201 as described above, which will not be described in detail again.

The repeater 402 may receive content data to be displayed on the plurality of display screens $\mathbf{210}_1$ to $\mathbf{210}_N$ of the electronic label 401 and distribute the content data to the communicator 2202 of the electronic label 401 according to a signal strength between the repeater 402 and the communicator 2202 of the electronic label 401. The communicator 2202 of the electronic label 401 may receive content data to be displayed on the plurality of display screens from the repeater 402. The controller 2203 of the electronic label 401 may include a serial data interface, and the controller 2203 may transmit, through the serial data interface, the content data to be displayed on the plurality of display screens and a control signal generated by the controller for controlling the plurality of display screens $\mathbf{210}_1$ to $\mathbf{210}_N$ to the plurality of display screens $\mathbf{210}_1$ to $\mathbf{210}_N$ respectively, so as to control the plurality of display screens $\mathbf{210}_1$ to $\mathbf{210}_N$ to display the respective content data received according to the control signal.

Although one electronic label 401 and one repeater 402 are shown in FIG. 4A, embodiments of the present disclosure are not limited thereto. The number of the electronic label(s) and the number of the repeater(s) of the electronic label system may be set as desired in practice. For example, according to some embodiments of the present disclosure, the electronic label system may include a plurality of electronic labels and a plurality of repeaters. Each repeater may provide respect content data to respect electronic label (s) according to the route strategy.

FIG. 4B schematically illustrates a flowchart of a method for driving an electronic label according to an embodiment of the present disclosure. As shown in FIG. 4B, the driving method may include the following steps.

In step S410, a communicator receives content data to be displayed on a plurality of display screens.

In step S420, the controller transmits the content data to be displayed on the plurality of display screens and a control signal generated by the controller for controlling the plurality of display screens to the plurality of display screens through a serial data interface respectively.

In step S430, the plurality of display screens display the respective content data received according to the control signal.

According to the above embodiments, the serial data interface of the controller 2203 may include a clock interface, a data interface, and at least one selection interface. Therefore, transmitting, by the controller 2203, the content data to be displayed on the plurality of display screens and the control signal generated by the controller for controlling the plurality of display screens to the plurality of display screens through the serial data interface respectively may specifically include: selecting at least one of the plurality of display screens through the at least one selection interface, transmitting a synchronization clock signal to the plurality of display screens through the clock interface, and serially transmitting the content data to be displayed on the plurality of display screens and the control signal to the plurality of display screens through the data interface under synchronous control of the synchronization clock signal.

According to the embodiments of the present disclosure, in step S410, the content data to be displayed on the plurality of display screens is received by the repeater 2206, and is distributed to the communicator 2202 according to a signal strength between the repeater 2206 and the communicator 2202.

According to the embodiments of the present disclosure, the communicator 2202 may further receive control instructions form an application installed on a mobile phone. The control instructions may be used to control the at least one of the plurality of display screens $\mathbf{210}_1$ to $\mathbf{210}_N$.

A process of driving the plurality of display screens $\mathbf{210}_1$ to $\mathbf{210}_N$ by the driving circuit 220 in order to display the same content or different content on the plurality of display screens $\mathbf{210}_1$ to $\mathbf{210}_N$ will be described in detail below with reference to FIGS. 4B to 6B.

In some embodiments, when the content data to be displayed on the plurality of display screens are the same, in response to the content data to be displayed on the plurality of display screens being the same, the controller 2203 may select the plurality of display screens through the at least one selection interface at the same time. The above data transmission process will be described in detail below with reference to FIGS. 5A and 5B. Here, FIG. 5A schematically illustrates a flowchart of a method for driving an electronic label according to an example of the present disclosure, and FIG. 5B schematically illustrates a signal timing diagram of the exemplary method shown in FIG. 5A, for example.

As shown in FIG. 5A, the exemplary method may include the following steps.

In step S510, serial data signals in a serial data interface are initialized. For example, selection signals $CS_1$ to $CS_M$ may be set to a second level (for example, a low level shown in FIG. 5B), so that the display screens are not selected. The data interface may be set to be in a high impedance state. Data transmission may be set to be performed on, for example, a rising edge of a synchronization clock signal CLK. It may be understood by those skilled in the art that the data transmission may also be set to be performed on, for example, a falling edge of the synchronization clock signal CLK.

FIG. 5B schematically illustrates a signal timing diagram of the exemplary method shown in FIG. 5A, and description will be made by taking two display screens $\mathbf{210}_1$ and $\mathbf{210}_2$ being connected as an example. As shown in FIG. 5B, in an initial period T0, the controller 2203 initializes a serial data interface. Here, a selection signal $CS_1$ connected to the display screen $\mathbf{210}_1$ and a selection signal $CS_2$ connected to the display screen $\mathbf{210}_2$ are set to a low level at the same time. A data interface is set to be in a high impedance state.

It should be illustrated that before the serial data signals are initialized, other modules of the driving circuit 220 may also be initialized. For example, a current ambient temperature may be acquired through a temperature sensor module (included in the display screens or outside the display screens) during the initialization phase, and then data of the ambient temperature is transmitted to the display screens as a control signal parameter. This is because for the electronic label having electronic ink screens as the display screens, different display modes may be selected according to the current ambient temperature, so that the content data is displayed more clearly.

Next, in step S520, all the display screens $\mathbf{210}_1$ to $\mathbf{210}_N$ are selected by setting all the selection signals $CS_1$ to $CS_M$ to a valid level, that is, a first level (for example, a high level shown in FIG. 5B).

As shown in FIG. 5B, at a certain time after the first period T0, the controller 2203 sets the selection signal $CS_1$ connected to the display screen $\mathbf{210}_1$ and the selection signal $CS_2$ connected to the display screen $\mathbf{210}_2$ to a high level at the same time, and thereby the display screens $\mathbf{210}_1$ and $\mathbf{210}_2$ are selected at the same time.

Then, in step S530, the content data is serially transmitted through the data interface DATA under control of the synchronization clock signal CLK.

As shown in FIG. 5B, the content data is transmitted during a first period T1. In addition to valid content data to be displayed, the content data may also include a type flag and an end flag. As described above, the type flag is used to indicate whether the transmitted data is content data or a control signal. In this example, the type flag indicates that the transmitted data is content data. The end flag is used to indicate the end of the data transmission. The first period T1 includes duration of several synchronization clock signals, wherein the valid content data is transmitted on a rising edge of each of the synchronization clock signal pulses, and the display screens $\mathbf{210}_1$ and $\mathbf{210}_2$ receive the valid content data at the same time, and store the received valid content data in respective buffers. A length of the first period T1 is determined by a data amount of the valid content data to be transmitted.

Then, in step S540, the controller 2203 acquires state signals fed back by the display screens $\mathbf{210}_1$ and $\mathbf{210}_2$ during a preset time period. Each of the state signals indicates whether a corresponding display $\mathbf{210}_1$ or $\mathbf{210}_2$ has completed data transmission and is ready for refreshing display. For example, when the state signal from the display screen 2101 is at the first level (for example, the high level shown in FIG. 5B), it indicates that the display screen $\mathbf{210}_1$ has completed data transmission, and may refresh the display. When the state signal from the display screen $\mathbf{210}_1$ is at the second level (for example, the low level shown in FIG. 5B), it indicates that the display screen $\mathbf{210}_1$ has not completed data transmission, and may not refresh the display.

As shown in the example of FIG. 5B, the state signal from the display screen $\mathbf{210}_1$ is a state signal 1 which, for example, is transmitted to the controller 2203 through a state signal output port of the display screen $\mathbf{210}_1$ connected to the controller 2203. For example, a state signal output port may be a port of one of the plurality of display screens $\mathbf{210}_1$ to $\mathbf{210}_N$, and is mainly used to feed back a state of the display screen. The state signal of the display screen $\mathbf{210}_2$ is a state signal 2, which is transmitted to the controller 2203 through a state signal output port of the display screen $\mathbf{210}_2$ connected to the controller 2203. The display screen $\mathbf{210}_1$ sets the state signal 1 to a high level after completing the data transmission with the controller 2203. The display screen $\mathbf{210}_2$ sets the state signal 2 to a high level after completing the data transmission with the controller 2203. The controller 2203 collects the state signal 1 and the state signal 2 during a second period T2.

Next, in step S550, the controller 2203 determines whether all state signals are at a high level, and if so, in step S560, the controller 2203 serially transmits the control signal through the data interface DATA under control of the synchronization clock signal CLK.

As shown in FIG. 5B, when the collected state signal 1 and state signal 2 are both at a high level, the controller 2203 determines that the display screens $\mathbf{210}_1$ and $\mathbf{210}_2$ are ready for refreshing display. Therefore, during a third period T3, the control signal is transmitted to the display screens $\mathbf{210}_1$ and $\mathbf{210}_2$ at the same time. The control signal may include a refresh signal for refreshing the display. In some embodiments, the control signal may further include temperature data and other control parameters. Similarly to a data format of the content data, the control signal includes a valid control signal, a type flag, and an end flag. The type flag is used to indicate that the transmitted data is a control signal, and the end flag is used to indicate the end of data transmission. The third period T3 may include duration of several synchronization clock signals. The control signal is transmitted on a rising edge of each of the synchronization clock signal pulses, and the display screens $\mathbf{210}_1$ and $\mathbf{210}_2$ receive the control signal at the same time. Similarly, a length of the third period T3 is determined by a data amount of control signals to be transmitted.

After the control signal is transmitted completely, the controller 2203 sets the selection signals $CS_1$ and $CS_2$ to a low level, and the data transmission between the controller 2203 and the display screens $\mathbf{210}_1$ and $\mathbf{210}_2$ ends.

Next, in step S570, the display screens $\mathbf{210}_1$ and $\mathbf{210}_2$ refresh the display respectively according to the received control signal. When the display screens $\mathbf{210}_1$ and $\mathbf{210}_2$ refresh the display, the display screens $\mathbf{210}_1$ and $\mathbf{210}_2$ reset the respective state signal 1 and state signal 2 to a low level at the same time, as shown in FIG. 5B.

If the controller 2203 determines in step S550 that not all the state signals are at a high level, the controller 2203 returns to step S530 to retransmit the content data.

For example, if the state signal 2 does not become a high level during the second period T2 in FIG. 5B, the controller 2203 may retransmit the content data instead of the control signal during the third period T3. A process of transmitting the content data is as described in step S530, and will not be repeated here.

In addition, it may be understood by those skilled in the art that the controller 2203 may select to retransmit the content data to the display screen $\mathbf{210}_2$ only during the third period T3. At this time, the controller 2203 needs to firstly set the selection signal $CS_1$ to a low level before transmitting the content data, that is, the display screen $\mathbf{210}_1$ does not receive the content data again. Then, when the control signal needs to be transmitted to the display screens $\mathbf{210}_1$ and $\mathbf{210}_2$, the selection signal $CS_1$ is set to a high level before the control signal is transmitted.

According to the embodiments of the present disclosure, when the same content is to be displayed on the plurality of display screens $\mathbf{210}_1$ to $\mathbf{210}_N$, the content data is transmitted to all the plurality of display screens $\mathbf{210}_1$ to $\mathbf{210}_N$ through the same synchronization clock signal interface and content/control data signal interface at the same time, which reduces a cost of the system while simplifying the operation of driving the plurality of display screens $\mathbf{210}_1$ to $\mathbf{210}_N$.

In some other embodiments, when the content data to be displayed on the plurality of display screens is different, in response to the content data to be displayed on the plurality of display screens being different, the controller 2203 may sequentially selects at least one of the plurality of display screens through the at least one selection interface. The above data transmission process will be described in detail below with reference to FIGS. 6A and 6B. Here, FIG. 6A schematically illustrates a flowchart of a method for driving an electronic label according to another example of the present disclosure, and FIG. 6B schematically illustrates a signal timing diagram of the exemplary method shown in FIG. 6A, for example.

As shown in FIG. 6A, the exemplary method may include the following steps.

In step S610, serial data signals in a serial data interface are initialized. An operation in this step is similar to that in step S510, and the initialization operation is performed during an initial period T0' shown in FIG. 6B, and will not be repeated here.

Next, in step S620, at least one of a plurality of display screens $\mathbf{210}_1$ to $\mathbf{210}_N$ are selected by setting at least one of selection signals $CS_1$ to $CS_M$ to a valid level, that is, a first level (for example, a high level shown in FIG. 6B).

As shown in FIG. 6B, at a certain time after the initial period T0', the controller 2203 sets the selection signal $CS_1$ connected to the display screen $\mathbf{210}_1$ to a high level, and thereby the display screen $\mathbf{210}_1$ is selected. The selection signal $CS_2$ connected to the display screen $\mathbf{210}_2$ remains at a low level, and thereby the display screen $\mathbf{210}_2$ is not selected.

Then, in step S630, the content data is serially transmitted through a data interface DATA under control of a synchronization clock signal CLK.

As shown in FIG. 6B, since only the display screen $\mathbf{210}_1$ is selected, during a first period T1', only the display screen $\mathbf{210}_1$ may receive the content data transmitted by the controller 2203, and the display screen $\mathbf{210}_2$ may not receive the content data transmitted by the controller 2203. The content data includes valid content data, a type flag, and an end flag. The type flag is used to indicate that the transmitted data is content data, and the end flag is used to indicate the end of data transmission. The first period T1' may include duration of several synchronization clock signal pulses. The content data is transmitted on a rising edge of each of the synchronization clock signal pulses, and the display screen $\mathbf{210}_1$ receives the content data and stores the received content data in its own buffer $\mathbf{210}_1$. A length of the first period T1' may be determined by a data amount of the content data to be displayed on the display screen $\mathbf{210}_1$.

Then, in step S640, the controller 2203 acquires a state signal fed back by the selected at least one display screen during a preset time period. The state signal indicates whether the selected at least one display screen has completed data transmission and is ready for refreshing the display.

As shown in FIG. 6B, a state signal of the display screen $\mathbf{210}_1$ is a state signal 1, which is transmitted to the controller 2203 through a state signal output port of the display screen $\mathbf{210}_1$ connected to the controller 2203. The display screen $\mathbf{210}_1$ sets the state signal 1 to a high level after completing the data transmission with the controller 2203. The controller 2203 collects the state signal 1 during a second period T2'.

Next, in step S650, the controller 2203 determines whether all the state signals of the selected at least one display screen are at a high level, and if so, in step S660, the controller 2203 transmits a control signal serially through the data interface DATA under control of the synchronization clock signal CLK.

As shown in FIG. 6B, when the collected state signal 1 is at a high level, the controller 2203 determines that the display screen $\mathbf{210}_1$ is ready for refreshing the display. Therefore, during a third period T3', the control signal is transmitted to the display screen $\mathbf{210}_1$. The definition of the control signal has been described in the above embodiment, and will not be repeated here.

After the control signal has been transmitted, the controller 2203 sets the selection signal $CS_1$ to a low level, and the data transmission between the controller 2203 and the display screen $\mathbf{210}_1$ ends.

If the controller 2203 determines in step S650 that not all the state signals of the selected at least one display screen are at a high level, for example, if the controller 2203 selects two display screens (for example, the display screen $\mathbf{210}_1$ and another display screen other than the display screen $\mathbf{210}_2$) in step S620, and the controller 2203 determines that the state signal 1 of the display screen $\mathbf{210}_1$ is not at a high level, the controller 2203 returns to step S630 to retransmit the content data. A process of retransmitting the content data has been described in the above embodiments, and will not be repeated here.

Next, in step S670, the selected at least one display screen refreshes the display according to the received control signal.

As shown in FIG. 6B, during a fourth time period T4, the display screen $\mathbf{210}_1$ refreshes its display according to the received control signal, while the display screen $\mathbf{210}_2$ does not refresh the display. As shown in FIG. 6B, the display screen $\mathbf{210}_1$ resets its state signal 1 to a low level at the same time.

Next, in step S680, the controller 2203 determines whether all the content data has been transmitted. If a determination result is no, it indicates that there is content data which needs to be transmitted to other display screens, and therefore the procedure returns to step S610 to repeat steps S610 to S670, and the operation ends until all the content data has been transmitted.

As shown in FIG. 6B, during a fifth period T5, the controller 2203 performs an initialization operation on the serial data signals in the serial data interface again, and selects the display screen $\mathbf{210}_2$ by setting the selection signal $CS_2$ to a high level. In addition, it should be illustrated that, in one example, after the controller 2203 completes transmission of the control signal to the display screen $\mathbf{210}_1$, and has sets a corresponding selection signal (for example, $CS_1$) to an invalid level, and it is determined that the transmission of the content data has not been completed, transmission of the content data to a next display screen may be started. Therefore, in FIG. 6B, although the fifth period T5 is shown after the fourth period T4, according to the embodiment of the present disclosure, the fifth period T5 and an execution time of subsequent operations may be concurrent with the fourth period T4.

According to the embodiments of the present disclosure, when different content is to be displayed on the plurality of display screens $\mathbf{210}_1$ to $\mathbf{210}_N$, the content data is sequentially transmitted to all the plurality of display screens $\mathbf{210}_1$ to $\mathbf{210}_N$ through the same synchronization clock signal interface and the content/control data signal interface, which may reduce a cost of the system, improve the efficiency of transmission between the controller and the display screens, and simplify the operation of driving the plurality of display screens.

It should be illustrated that, in the above description, the technical solutions according to the embodiments of the present disclosure are shown by way of example only, but it does not mean that the embodiments of the present disclosure are limited to the above steps and structures. Where possible, the steps and structures may be adjusted and selected as needed. Therefore, certain steps and units are not elements necessary to implement the general inventive concept of the embodiments of the present disclosure.

The present disclosure has been described so far in connection with the preferred embodiments. It should be understood that those skilled in the art can make various other changes, substitutions, and additions without departing from the spirit and scope of the embodiments of the present disclosure. Therefore, the scope of the embodiments of the present disclosure is not limited to the specific embodiments described above, but should be defined by the appended claims.

We claim:

1. An electronic label, comprising:
- a plurality of display screens;
- a communicator configured to receive content data to be displayed on the plurality of display screens; and
- a controller comprising a serial data interface and configured to transmit, through the serial data interface, the content data to be displayed on the plurality of display screens and a control signal generated by the controller for controlling the plurality of display screens to the plurality of display screens respectively, so as to control the plurality of display screens to display the respective content data received according to the control signal;
- wherein the serial data interface comprises:
  - at least one selection interface configured to select at least one of the plurality of display screens;
  - a clock interface configured to transmit a synchronization clock signal to the plurality of display screens; and
  - a data interface configured to serially transmit the content data to be displayed on the plurality of display screens and the control signal to the plurality of display screens under control of the synchronization clock signal.

2. The electronic label according to claim 1, wherein a number of the at least one selection interface is less than or equal to a number of the plurality of display screens.

3. The electronic label according to claim 1, wherein a number of the at least one selection interface is less than a number of the plurality of display screens, and selection signals transmitted through the at least one selection interface are encoded and decoded to generate a selection signal corresponding to each of the plurality of display screens.

4. The electronic label according to claim 1, wherein each of the plurality of display screens comprises a buffer configured to store content data received from the controller to be displayed on the display screen.

5. The electronic label according to claim 1, wherein the display screens are electronic ink screens, and
- the electronic label further comprises a booster circuit connected to the electronic ink screens and configured to power on and power off the electronic ink screens.

6. The electronic label according to claim 3, wherein the booster circuit is further connected to the controller, and is controlled by the controller to power on and power off the electronic ink screens.

7. The electronic label according to claim 1, wherein the content data comprises a type flag and an end flag, wherein the type flag is used to indicate whether the transmitted data is content data or a control signal, and the end flag is used to indicate the end of data transmission.

8. The electronic label according to claim 1, further comprising a Near Field Communication (NFC) antenna connected to the controller, and the controller is further configured to transmit an identification information of the electronic label by using the NFC antenna in response to an identification request signal received by the NFC antenna.

9. The electronic label according to claim 8, wherein the NFC antenna is an NFC coil and the controller is a micro controller unit (MCU).

10. An electronic label system, comprising:

an electronic label comprising a plurality of display screens, a communicator, and a controller, wherein the communicator is configured to receive content data to be displayed on the plurality of display screens from a repeater, the controller comprises a serial data interface, and the controller is configured to transmit, through the serial data interface, the content data to be displayed on the plurality of display screens and a control signal generated by the controller for controlling the plurality of display screens to the plurality of display screens respectively, so as to control the plurality of display screens to display the respective content data received according to the control signal; and the repeater configured to receive content data to be displayed on the plurality of display screens and distribute the content data to the communicator;

wherein the serial data interface comprises:

at least one selection interface configured to select at least one of the plurality of display screens;

a clock interface configured to transmit a synchronization clock signal to the plurality of display screens; and a data interface configured to serially transmit the content data to be displayed on the plurality of display screens and the control signal to the plurality of display screens under control of the synchronization clock signal.

11. The electronic label system according to claim 10, wherein the electronic label further comprises a Near Field Communication (NFC) antenna connected to the controller, and the controller is further configured to transmit an identification information of the electronic label by using the NFC antenna in response to an identification request signal received by the NFC antenna.

12. The electronic label according to claim 11, wherein the NFC antenna is an NFC coil and the controller is a micro controller unit (MCU).

* * * * *